United States Patent
Abe et al.

(10) Patent No.: US 7,530,014 B2
(45) Date of Patent: May 5, 2009

(54) DATA PROCESSING AND DIFFERENCE COMPUTATION FOR GENERATING ADDRESSING INFORMATION

(75) Inventors: Mari Abe, Hadano (JP); Teruo Koyanagi, Yamato (JP); Kohichi Ono, Tokyo (JP); Masahiro Hori, Yokohama (JP); Takuya Nakaike, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 10/612,786

(22) Filed: Jul. 2, 2003

(65) Prior Publication Data

US 2004/0088652 A1  May 6, 2004

(30) Foreign Application Priority Data

Jul. 15, 2002  (JP) .............................. 2002-206202

(51) Int. Cl.
*G06F 17/00* (2006.01)
(52) U.S. Cl. .................... 715/234; 715/233; 715/239
(58) Field of Classification Search ................. 715/511, 715/512, 513, 234, 233, 239; 707/4
See application file for complete search history.

(56) References Cited

U.S. PATENT DOCUMENTS

| 6,785,673 | B1* | 8/2004 | Fernandez et al. | ............. 707/3 |
| 6,848,079 | B2* | 1/2005 | Ito | ............................ 715/523 |
| 2002/0054090 | A1* | 5/2002 | Silva et al. | .................. 345/747 |

OTHER PUBLICATIONS

Masahiro Hori, 'Robustness of External Annotations for Web-page Clipping', Copyright 2000 ACM pp. 1-8.*

* cited by examiner

*Primary Examiner*—Stephen S Hong
*Assistant Examiner*—Matthew J Ludwig
(74) *Attorney, Agent, or Firm*—Ido Tuchman; Kenneth R. Corsello

(57) ABSTRACT

Methods, apparatus and systems to keep a desired element properly addressed in a structured document in which particular elements are addressed, even if the structured document is modified. In an example embodiment, the invention comprises a difference computation unit for computing a difference between structured documents, and an XPath update unit for generating addressing information from addressing information that addresses a part of a particular structured document based on information on the difference computed by the difference computation unit, the generated addressing information addressing a corresponding part of the other structured document.

4 Claims, 14 Drawing Sheets

| NODES BEFORE MODIFICATION | NODES AFTER MODIFICATION |
|---|---|
| N 0 | N' 0 |
| N 1 | N' 1 |
| N 2 | N' 2 |
| N 3 | (non existent) |
| ⋮ | ⋮ |
| N n | N' n |

Fig. 16
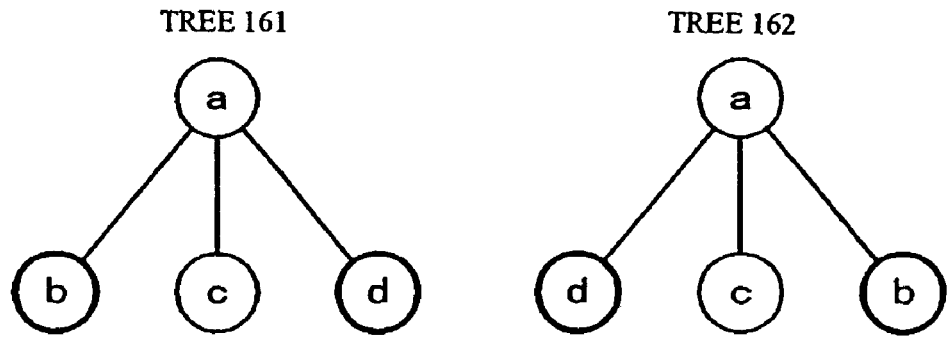
Fig. 17
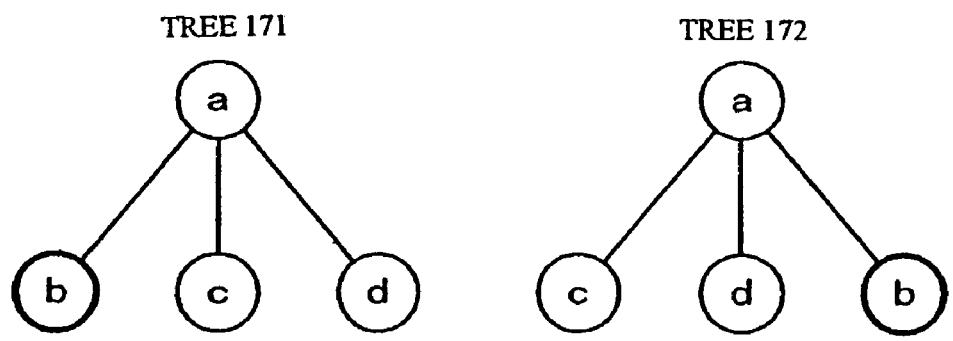
Fig. 18
```
<a>
  <b>
    <d></d>
    Hello
  </b>
</a>
```

DATA PROCESSING AND DIFFERENCE COMPUTATION FOR GENERATING ADDRESSING INFORMATION

FIELD OF THE INVENTION

This invention is directed to addressing an element in a document written in a language such as XML (Extensible Markup Language) or HTML (Hypertext Markup Language). It is more particularly directed to updating a designation expression for an element when an document is modified.

BACKGROUND OF THE INVENTION

Structured documents written in XML, HTML, or other languages used for data exchanges over networks such as the Internet (referred to as structured documents hereafter) may have meta information, such as annotations, that addresses particular elements in the structured documents. The structured documents may also have modification rules written in the documents in advance, under which the documents are modified. To add these meta information and modification rules to the structured documents, XPath (XML Path Language) is often used to address particular positions in the structured documents so that external documents are referred to.

XPath is a language for addressing particular parts of a structured document. Using XPath as addressing information allows arbitrarily specifying those positions in the structured document to which annotations are added or modifications are made. In the subsequent description, data written in XPath will also be simply referred to as an XPath.

Specifically, XPath is written in the following manner. FIG. 18 shows an exemplary structure of an XML document, a type of structured document. A root element is expressed as "/" in XPath. Therefore, for the XML document in FIG. 18, an element a is a child element of a root and expressed as "/a." Elements b and d are expressed as "/a/b" and "/a/b/d", respectively. An XPath expression "//p[id="foo"]", for example, selects all p elements in an XML document that have "foo" as their id attributes.

As described above, XPath allows arbitrarily addressing particular elements in a structured document such as an XML or HTML/XML document. However, if the structured document subjected to designation is modified, elements or their positions in the document change. Therefore, the position designation in XPath may get out of order, and desired elements may not be properly addressed.

Conventionally, to keep the desired elements properly addressed in the structured document in this case, XPath descriptions have to be modified manually. This requires significant efforts and imposes a heavy burden on a developer of a system involving this structured document.

SUMMARY OF THE INVENTION

Thus, an aspect of the invention is to keep a desired element properly addressed in a structured document in which particular elements are addressed, even if the structured document is modified.

Another aspect of the invention, is to provide means for automatically updating an XPath addressing a particular element in a structured document based on a modification made to the structured document if the structured document is modified.

An example embodiment of the invention to achieve the above objects is implemented as a data processing method for addressing an predetermined element or sets of elements in a structured document. The data processing method comprises the steps of: when a structured document having an element addressed by predetermined addressing information is modified, inputting the structured document to analyze a modification; and updating the addressing information according to the analyzed modification made to the structured document so that the addressing information addresses a corresponding element or corresponding elements in the modified structured document.

In an alternate embodiment of the invention to achieve the above aspects is also implemented as an addressing information generation system for performing such data processing. The addressing information generation system comprises: a difference computation unit for computing a difference between structured documents; and an addressing information generation unit for generating addressing information from addressing information that addresses a part of a particular structured document based on information on the difference computed by the difference computation unit, the generated addressing information addressing a corresponding part of the other structured document.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 16 shows an exemplary difference computation for trees;

FIG. 17 shows another exemplary difference computation for trees; and

FIG. 18 shows an example of an XML document.

DESCRIPTION OF SYMBOLS

Figure 1:
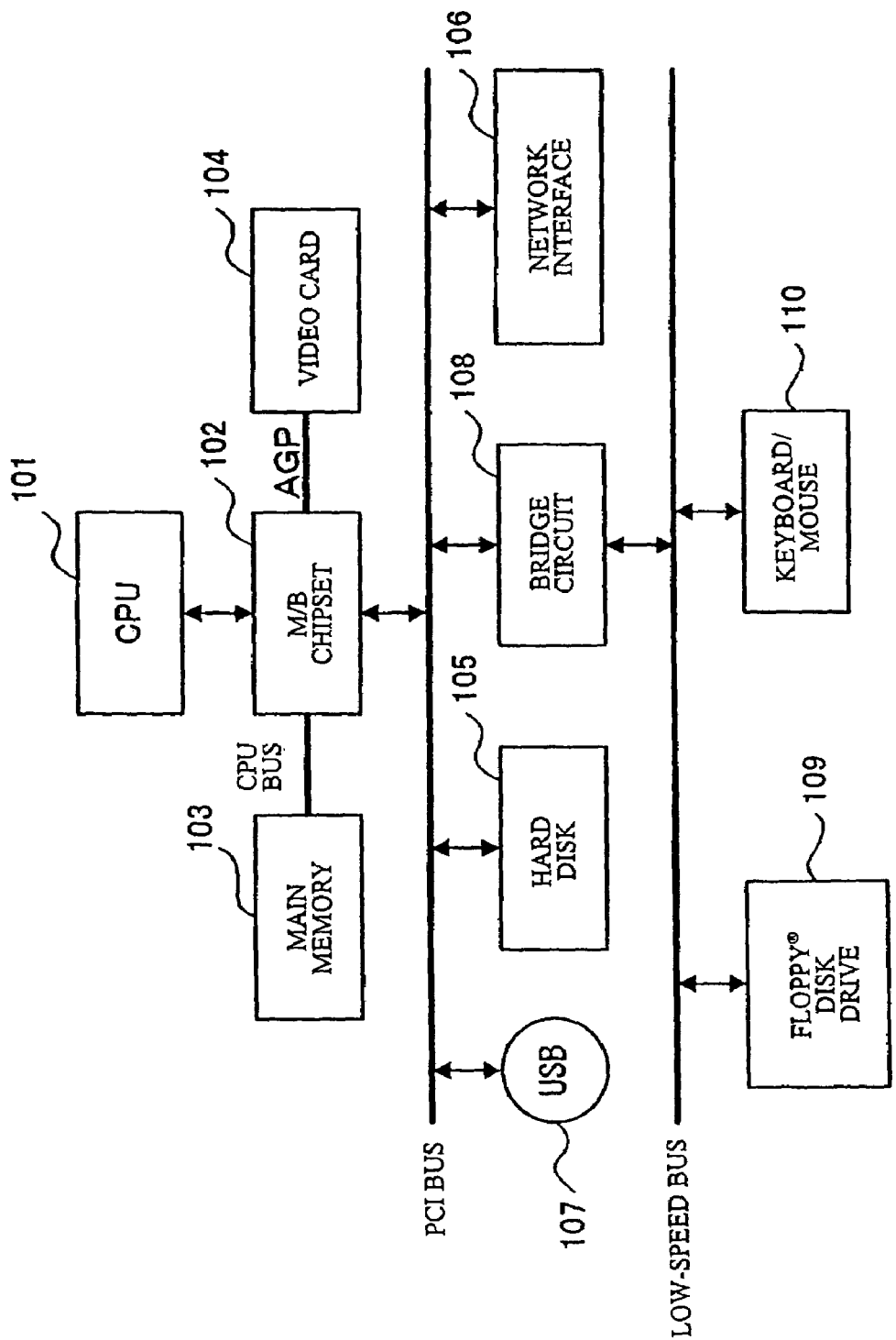
FIG. 1 is a schematic diagram of an exemplary hardware configuration of a computer suitable for implementing a method for updating an XPath according to an embodiment.

| | |
|---|---|
| 10 | Document analysis unit |
| 20 | Difference computation unit |
| 30 | XPath update unit |
| 31 | XPath interpreter |
| 32 | Node correspondence table |
| 33 | XPath generator |
| 101 | CPU |
| 102 | M/B chipset |
| 103 | Main memory |
| 105 | Hard disk |

DESCRIPTION OF THE INVENTION

The present invention provides methods, apparatus and systems to keep a desired element properly addressed in a structured document in which particular elements are addressed, even if the structured document is modified. The invention also provides means for automatically updating an XPath addressing a particular element in a structured document based on a modification made to the structured document if the structured document is modified.

An example of a method of the invention, is implemented as a data processing method for addressing predetermined element or sets of elements in a structured document. The method includes the steps of: when a structured document having an element addressed by predetermined addressing information is modified, inputting the structured document to analyze a modification; and updating the addressing information according to the analyzed modification made to the structured document so that the addressing information addresses a corresponding element or corresponding elements in the modified structured document.

Specifically, the step of analyzing a modification made to the structured document comprises: converting an unmodified version and a modified version of the structured document into tree-structured data items; and computing a difference between the tree-structured data items. The addressing information is updated based on the difference between the tree-structured data items.

More specifically, the processing of computing the difference between the tree-structured data items is performed to track a component of the tree-structured data items that is moved in operations required for transformation between the tree-structured data items transformed from one to the other according to modification of the structured document.

Preferably, an XPath may be used as the addressing information for addressing the element in the structured document.

Then, updating the addressing information comprises updating an XPath describing the addressing information by regenerating LocationSteps forming the XPath based on the difference between the unmodified version and the modified version of the structured document.

The invention to achieve the above objects is also implemented as an addressing information generation system for performing such data processing. The addressing information generation system comprises: a difference computation unit for computing a difference between structured documents; and an addressing information generation unit for generating addressing information from addressing information that addresses a part of a particular structured document based on information on the difference computed by the difference computation unit, the generated addressing information addressing a corresponding part of the other structured document.

More preferably, the addressing information generation system further comprises a document analysis unit for analyzing structures of the structured documents and converting the structures into tree-structured data items, wherein the difference computation unit computes the difference by comparing the tree-structured data items corresponding to the structured documents converted by the document analysis unit.

The invention to achieve the above objects may also be implemented as a method for computing a difference between at least two tree-structured data items. The method comprises the steps of: reading at least two tree-structured data items to be processed from memory to compare the at least two tree-structured data items and creating an operation sequence, in which each operation for transforming one of the tree-structured data items into the other tree-structured data item is expressed as a combination of predetermined operations on a component of a tree-structure; and changing operations in the operation sequence that are interpreted as a movement of a component into an operation of moving the component.

The components of the tree-structures include nodes and subtrees of the trees. The combination of predetermined operations on a component of the tree-structure is a combination of basic operations such as inserting, removing, and modifying the component.

More specifically, the step of changing the operation sequence in the list comprises adding an operation of moving a component of the tree-structured data items to the operation sequences in place of a pair of operations of removing and inserting the component in the operation sequences.

The step further comprises replacing, based on a predetermined rule, an operation of modifying a component of the tree-structured data items in the operation sequences with a different operation that involves moving the component.

The invention to achieve the above objects is also implemented as an annotation server for managing annotation data made for an HTML/XML document. The annotation server comprises: difference computation means for computing, when the HTML/XML document for which the annotation data has been made is modified, a difference between an unmodified version and a modified version of the HTML/XML document; and XPath update means for updating, based on difference information obtained from computation by the difference computation means, an XPath associating the annotation data with a part of the HTML/XML document.

The invention to achieve the above objects is also implemented as a program for controlling a computer so that the computer performs processing corresponding to the steps of the data processing method or the method for computing a difference described above, or the invention is also implemented as a program for causing a computer to function as the system for updating addressing information or the annotation server described above. The program may be stored in and distributed as a magnetic disk, optical disk, semiconductor memory, or other storage media, or distributed through a network.

Now, the invention will be described in detail below based on an embodiment illustrated in the appended drawings.

FIG. 1 is a schematic diagram of an exemplary hardware configuration of a computer suitable for implementing a method for updating an XPath according to this embodiment.

The computer shown in FIG. 1 includes a CPU (Central Processing Unit) 101 as operation means; main memory 103 connected to the CPU 101 via a M/B (motherboard) chipset 102 and a CPU bus; a video card 104 also connected to the CPU 101 via the M/B chipset 102 and an AGP (Accelerated Graphics Port); a hard disk 105, a network interface 106, and a USB port 107 connected to the M/B chipset 102 via a PCI (Peripheral Component Interconnect) bus; and a floppy disk drive 109 and a keyboard/mouse 110 connected to the M/B chipset 102 via the PCI bus over a bridge circuit 108 and a low-speed bus such as an ISA (Industry Standard Architecture) bus.

It is noted that FIG. 1 is a mere illustration of a hardware configuration of a computer for realizing this embodiment, and various other configurations to which this embodiment can be applied may also be employed. For example, only video memory may be provided instead of the video card 104, in which case the CPU 101 processes image data. Further, a CD-ROM (Compact Disc Read Only Memory) driver or a DVD-ROM (Digital Versatile Disc Read Only Memory) driver may be provided via an interface such as ATA (AT Attachment).

Figure 2:
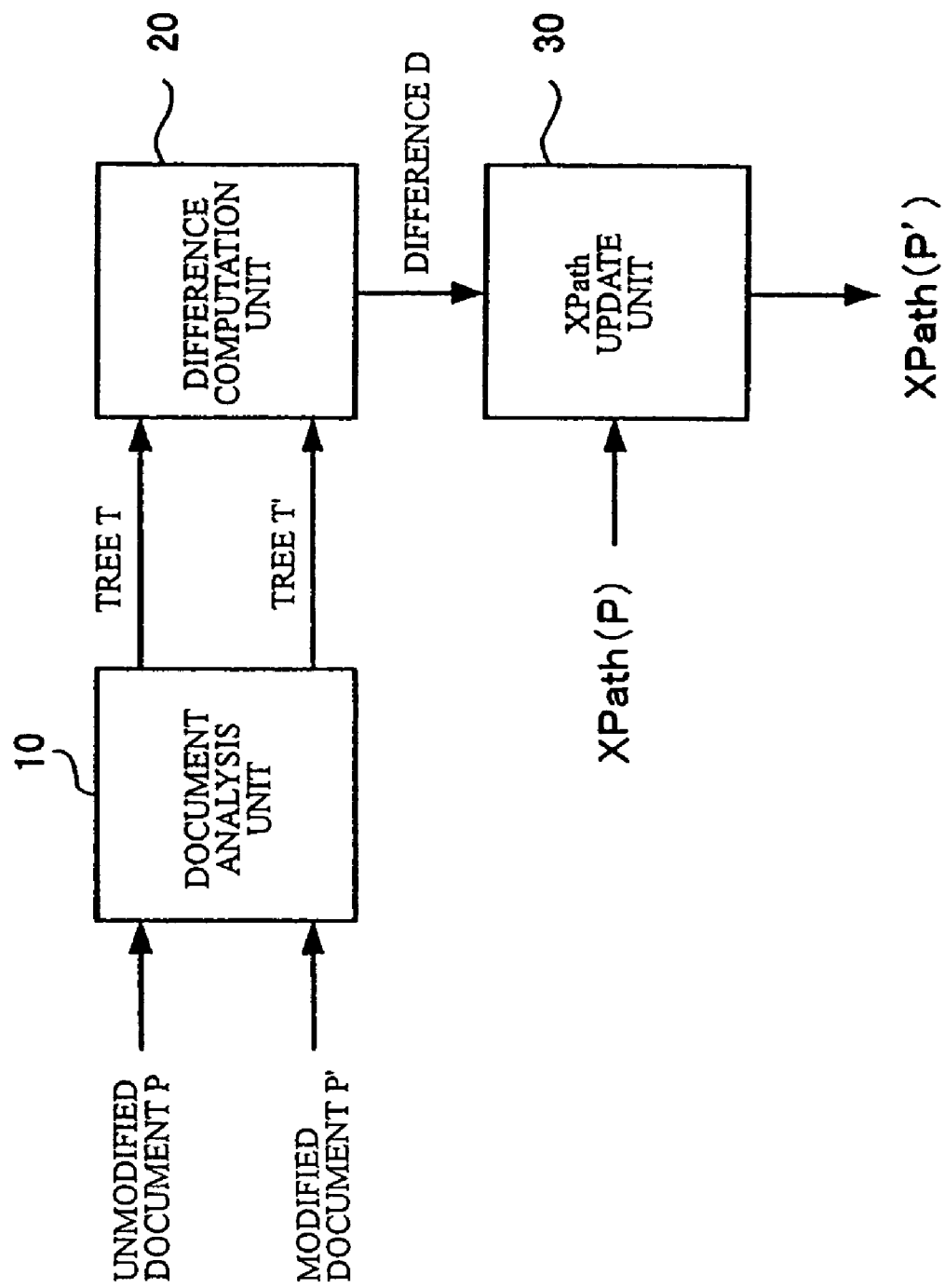
FIG. 2 shows a configuration of a system for updating an XPath according to the embodiment implemented in the computer shown in FIG. 1.

FIG. 2 shows a configuration of a system for updating an XPath according to this embodiment implemented in the computer shown in FIG. 1.

As shown in FIG. 2, the system for updating an XPath according to this embodiment includes a document analysis unit 10 for analyzing structures of a structured document, a difference computation unit 20 for checking modifications made to the structured document based on an analysis result of the document analysis unit 10, and an XPath update unit 30 for updating an XPath description, which is addressing information, based on a computation result of the difference computation unit 20.

These components are virtual software blocks provided by a program that is deployed in the main memory 103 shown in FIG. 1 and controls the CPU 101. The program that controls the CPU 101 to provide these functions may be stored in and distributed as a magnetic disk, optical disk, semiconductor memory, or other storage media, or distributed through a network. In this embodiment, the program is input via the network interface 106 or the floppy disk drive 109 shown in FIG. 1, or a CD-ROM drive (not shown) and stored in the hard disk 105. Then, the program stored in the hard disk 105 is loaded and deployed in the main memory 103, and executed by the CPU 101 to provide the functions of the components shown in FIG. 2.

The structured documents and the XPath to be processed are stored in a predetermined area, for example, an area in the hard disk 105, and read by the CPU 101 for XPath update processing according to this embodiment.

In this embodiment shown in FIG. 2, the document analysis unit 10 analyzes the structured documents and converts them into data in a tree-structure such as a DOM tree (the data will be simply referred to a tree hereafter). The documents to be converted are an unmodified version and a modified version of a modified structured document. That is, given a structured document to be processed (a modified structured document) stored in memory means such as the hard disk 105, the document analysis unit 10 reads and analyzes an unmodified version (called an unmodified document hereafter) P and a modified version (called a modified document hereafter) P' of the structured document, generates a tree T (corresponding to the unmodified document P) and a tree T' (corresponding to the modified document P'), and outputs the trees. The output trees T and T' are temporarily stored in memory means such as the main memory 103 to be used by the difference computation unit 20. A conventional technique may be used as a conversion algorithm for generating the trees of the structured document.

The difference computation unit 20 computes differences between the trees of the unmodified and modified structured documents converted by the document analysis unit 10. As a result, the details of the modifications made to the structured document to be processed are recognized. This embodiment proposes a novel method for computing the differences suitable for the XPath update to be performed later. Now, a difference computation algorithm of this method will be described below.

As background knowledge, a conventional difference computation algorithm generally used will be described. While various algorithms have been proposed for computing differences between two trees, a typical difference computation algorithm is the one that computes a minimum-cost operation sequence.

FIGS. 16 and 17 show exemplary difference computations for trees.

As shown in FIG. 16, given a tree structure with a parent node a and child nodes b, c, and d, a difference is computed between two trees 161 and 162 in which the positions of nodes b and d are exchanged. The processing cost of transformation between the trees is 1 for each of basic operations; RemoveNode for removing a node, InsertNode for inserting a node, and Modify for modifying the content of a node.

In this case, the algorithm for computing a minimum-cost operation sequence computes to determine that the transformation of the tree 161 into the tree 162 requires operations of modifying the content of the node b into the content of the node d (Modify (b→d)) and modifying the content of the node d into the content of the node b (Modify (d→b)). This is because these operations enable the tree 161 to be transformed into the tree 162 at the minimum processing cost of 2 according to the above mentioned processing cost value.

As shown in FIG. 17, given a tree structure with a parent node a and child nodes b, c, and d, a difference is computed between two trees 171 and 172 in which the position of the node b relative to the nodes c and d is different.

In this case, the algorithm for computing a minimum-cost operation sequence computes to determine that transformation of the tree 171 into the tree 172 requires operations of removing the node b from the tree 171 (RemoveNode (b)) and inserting the node b into a position shown in the tree 172 (InsertNode (b)). Again, this is because these operations enable the tree 171 to be transformed into the tree 172 at the minimum processing cost 2 according to the above mentioned processing cost value.

However, this algorithm for computing a minimum-cost operation sequence is not suitable for this embodiment, because the aim of the difference computation in this embodiment is the automatic XPath update. In the example of FIG. 16, if an XPath addresses the node b to the tree 161, the target of the XPath cannot be properly modified only with information that the content of the node is modified (from b into d). Here, the transformation of the tree 161 into the tree 162 can be interpreted as operations of moving the nodes b and d such that their positions are exchanged. Based on this information, the description of the XPath addressing the node b can be properly modified. Therefore, for use as the information for modifying the XPath, the operation sequence for transforming the tree 161 into the tree 162 can be more appropriately expressed with MoveNode, an operation of moving a node, as MoveNode (b) and MoveNode (d). However, MoveNode is a combination of the basic operations RemoveNode and InsertNode described above (operations of removing and inserting a node), thereby increasing the total cost of transformation of the tree 161 into the tree 162 to 4. Thus, the algorithm for computing a minimum-cost operation sequence cannot detect MoveNode.

Similarly, in the example of FIG. 17, the target of the XPath cannot be properly modified only with information on one of the operations of removing the node b and inserting the node b. Here, the transformation of the tree 171 into the tree 172 can be interpreted as an operation of moving the node b from the left of the node c to the right of the node d. Based on this information, the description of the XPath addressing the node b can be properly modified. Therefore, the operation sequence for transforming the tree 171 into the tree 172 can be more appropriately expressed as MoveNode (b). In this example, the total cost remains as 2 because MoveNode is a combination of RemoveNode and InsertNode. However, the algorithm for computing a minimum-cost operation sequence does not guarantee to detect MoveNode and thereby is not suitable for this embodiment.

The above discussion also applies to MoveTree, an operation of moving a subtree (partial tree structure within a tree). It should be understood that although the subsequent description addresses only the processing of nodes for simplicity, MoveTree may be similarly analyzed.

Based on the above discussion, a description will be given of the difference computation algorithm executed by the difference computation unit 20 and suitable for this embodiment. The difference computation algorithm used in this embodiment is designed to track objects (nodes and subtrees) that have been moved due to modification of a tree.

FIGS. 3 to 6 are flowcharts describing processing performed by the difference computation algorithm suitable for this embodiment.

The difference computation unit 20 receives inputs of the tree T corresponding to the unmodified document P and the tree T' corresponding to the modified document P' from memory means such as the main memory 103, where the trees have been temporarily stored. Then, it analyzes operations required for modifying the tree T into the tree T' in terms of the basic operations, RemoveNode, InsertNode, and Modify, and generates a list L of obtained operation sequences. The analysis may be performed using a conventional technique, such as the above described algorithm for computing a minimum-cost operation sequence. The generated list L of the operation sequences is temporarily stored in memory means such as the main memory 103. Then, the difference computation unit 20 analyzes the list L stored in the main memory 103 to detect MoveNode as shown in FIGS. 3 to 6.

Figure 3:
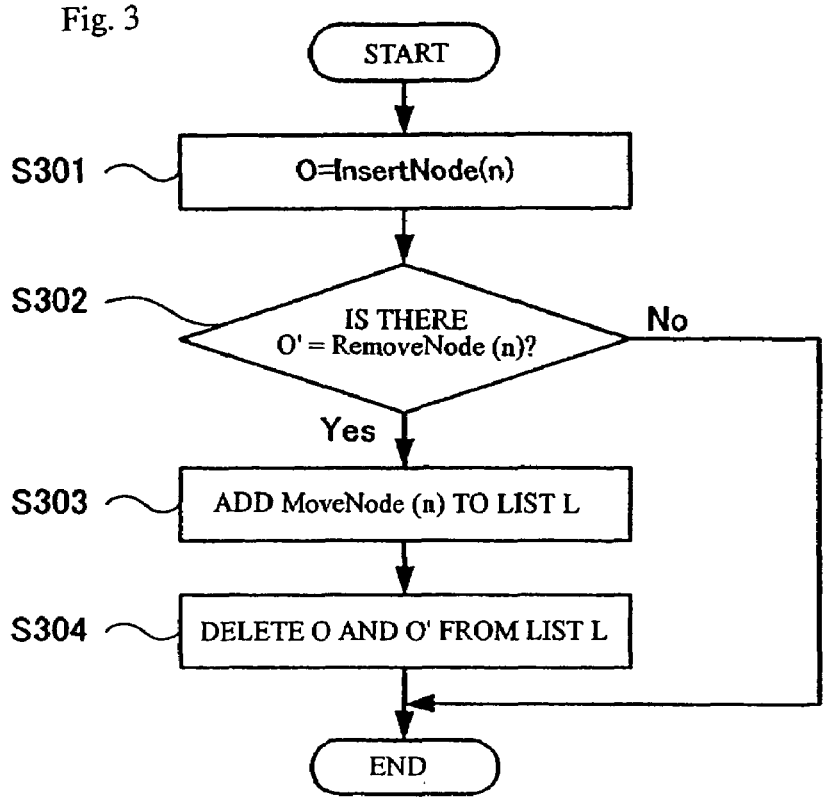
FIG. 3 is a flowchart of processing performed by a difference computation algorithm suitable for the embodiment, and more particularly an InsertNode analysis.

In an InsertNode analysis shown in FIG. 3, the difference computation unit 20 first takes a certain InsertNode (InsertNode (n)) in the list L as its focus (step 301). Then, it checks whether the list L has an operation RemoveNode for the same node as the target node of the focus InsertNode (in this figure, node n) (step 302). If the corresponding RemoveNode (RemoveNode (n)) is not in the list L, the node n is a node newly added to the tree T'. Therefore, the processing simply terminates.

If a RemoveNode (n) is in the list L, it makes up a MoveNode (n) in combination with the InsertNode (n). Therefore, a MoveNode (n) is added to the list L (step 303), and the InsertNode (n) and the RemoveNode (n) are deleted from the list L (step 304). In this manner, the difference computation unit 20 processes all InsertNode in the list L.

Figure 4:
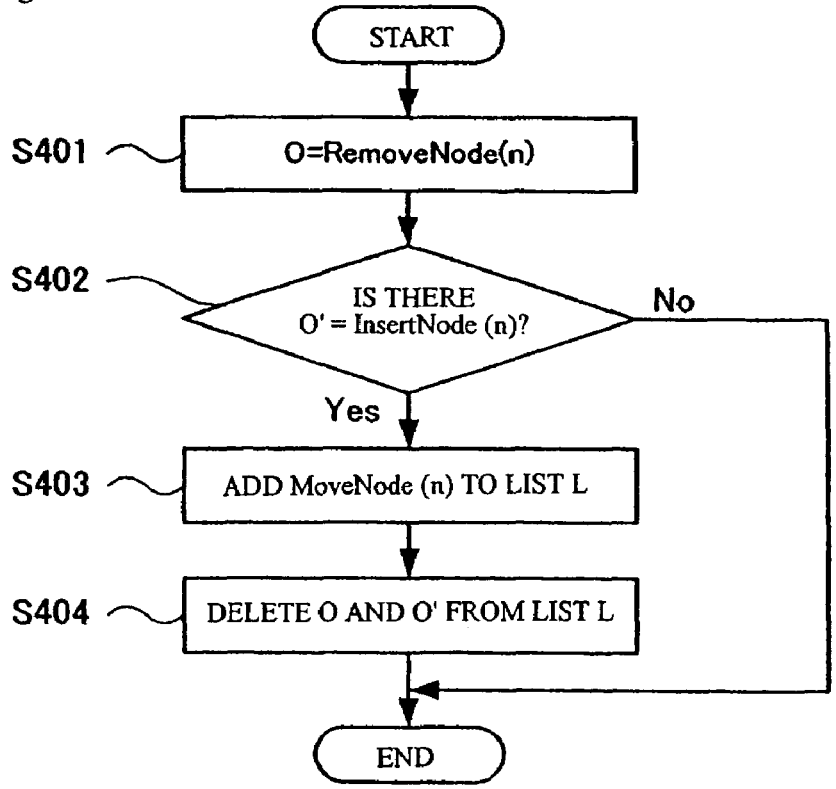
FIG. 4 is a flowchart of processing performed by the difference computation algorithm suitable for the embodiment, and more particularly a RemoveNode analysis.

In a RemoveNode analysis shown in FIG. 4, the difference computation unit 20 first takes a certain RemoveNode (RemoveNode (n)) in the list L as its focus (step 401). Then, it checks whether the list L has an operation InsertNode for the same node as the target node of the focus RemoveNode (in this figure, node n) (step 402). If the corresponding InsertNode (InsertNode (n)) is not in the list L, the node n is a node removed from the tree T'. Therefore, the processing simply terminates.

If an InsertNode (n) is in the list L, it makes up a MoveNode (n) in combination with the RemoveNode (n). Therefore, a MoveNode (n) is added to the list L (step 403), and the RemoveNode (n) and the InsertNode (n) are deleted from the list L (step 404). In this manner, the difference computation unit 20 processes all RemoveNode in the list L.

Figure 5:
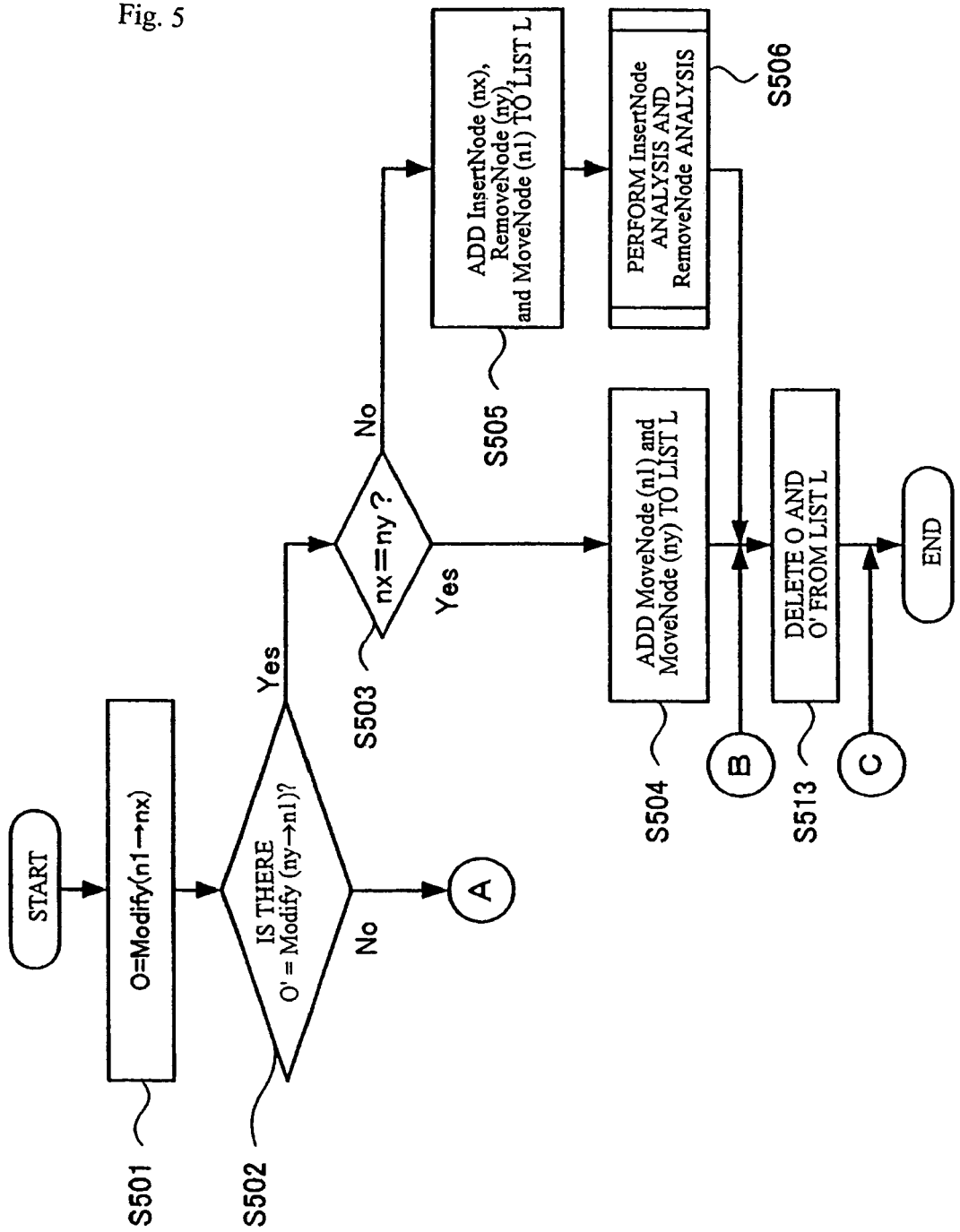
FIG. 5 is a flowchart of processing performed by the difference computation algorithm suitable for the embodiment, and more particularly a Modify analysis.
Figure 6:
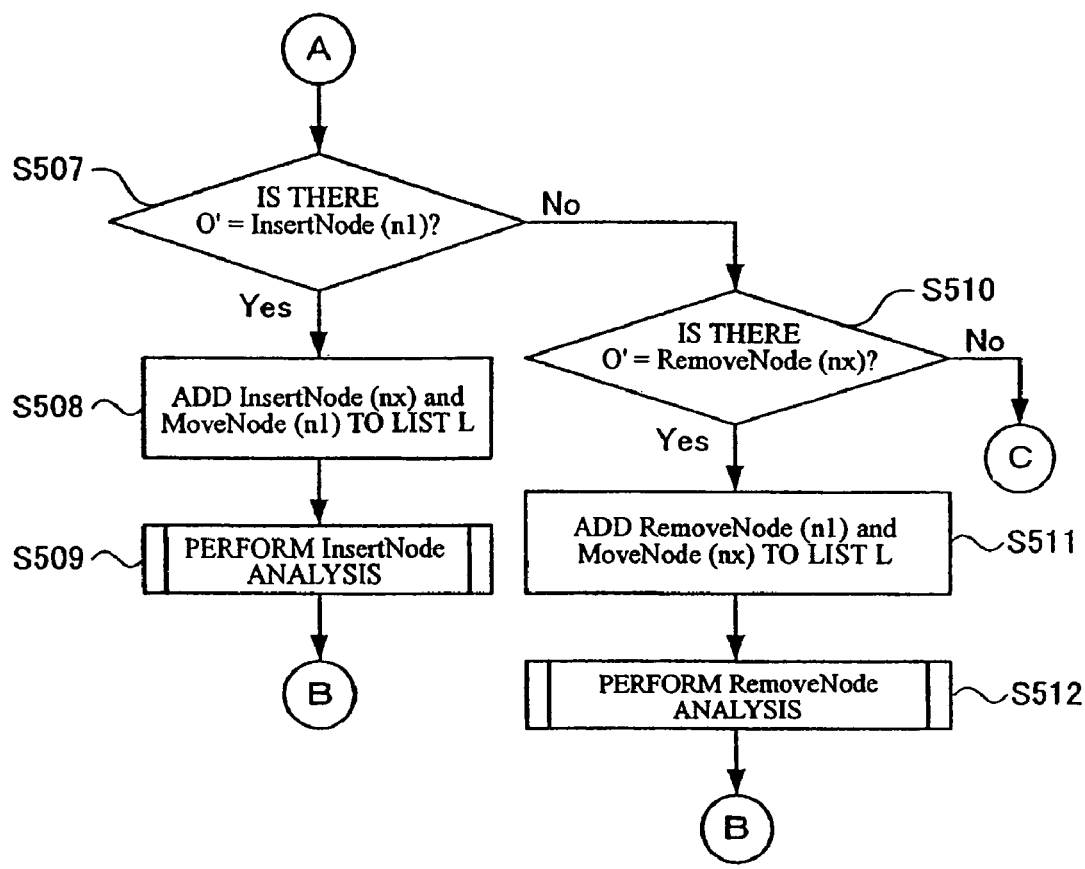
FIG. 6 is a flowchart of processing performed by the difference computation algorithm suitable for the embodiment, and more particularly the Modify analysis.

In a Modify analysis shown in FIGS. 5 and 6, the difference computation unit 20 first takes an operation Modify (n1→nx) for modifying the content of a node n1 in the list L as its focus (step 501). Then, it checks whether the list L has an operation Modify (ny→n1) for inversely modifying the content of a node into the n1 (step 502).

If a Modify (ny→n1) is in the list L, then the difference computation unit 20 checks whether the content of the node nx is identical with the content of the node ny (that is, nx=ny) (step 503). If nx=ny, it can be interpreted to mean that the positions of the node n1 and nx (=ny) have been exchanged. Therefore, a Movenode (n1) and a Movenode (ny) are added to the list L (step 504), and the Modify (n1→nx) and the Modify (ny→n1) are deleted from the list L (step 513).

If nx≠ny, it can be interpreted to mean that the node n1 has been moved to the original position of the node ny in the tree T, the node ny has been removed, and another node nx has been newly inserted into the original position of the node n1. Therefore, an InsertNode (nx), a RemoveNode (ny), and a Movenode (n1) are added to the list L (step 505), and further the InsertNode analysis and the RemoveNode analysis shown in FIGS. 3 and 4 are performed (step 506). Then, the Modify (n1→nx) and the Modify (ny→n1) are deleted from the list L (step 513).

If a Modify (ny→n1) is not in the list L in step 502, then the difference computation unit 20 checks whether an operation InsertNode (n1) for the node n1 is in the list L (step 507 in FIG. 6). If an InsertNode (n1) is in the list L, it can be interpreted to mean that the node n1 has been moved to another position, and another node nx has been inserted into the original position of the node n1. Therefore, an InsertNode (nx) and a Movenode (n1) are added to the list L (step 508), and further the InsertNode analysis shown in FIG. 3 is performed (step 509). Then, the Modify (n1→nx) and the InsertNode (n1) are deleted from the list L (step 513 in FIG. 5).

If an InsertNode (n1) is not in the list L in step 507, then the difference computation unit 20 checks whether an operation RemoveNode (nx) for the node n1 is in the list L (step 510 in FIG. 6). If a RemoveNode (nx) is in the list L, it can be interpreted to mean that the node n1 has been removed, and a node nx has been inserted to that position. Therefore, a RemoveNode (n1) and a MoveNode (nx) are added to the list L (step 511), and further the RemoveNode analysis shown in FIG. 3 is performed (step 512). Then, the Modify (n1→nx) and the RemoveNode (nx) are deleted from the list L (step 513 in FIG. 5).

If a RemoveNode (nx) is not in the list L in step 510, it can be interpreted to mean that the content of the node n1 has been simply modified into nx, and therefore the processing simply terminates. In this manner, the difference computation unit 20 processes all Modify in the list L.

Thus, the differences between the trees T and T' are computed. The obtained difference data is temporarily stored in memory means, such as the main memory 103, to be used by the XPath update unit 30. As realized in these three analysis, in this embodiment, all operations for the tree T to be transformed into the tree T' that can be interpreted as node movements are detected as moving operations Move so that they can be used in the subsequent XPath update processing.

The XPath update unit 30 receives an input of the computation result of the differences between the trees T and T' obtained by the difference computation unit 20 and an input of an XPath for the unmodified document P (referred to as XPath (P) hereafter). Based on these inputs, the XPath update unit 30 then generates and outputs an XPath for the modified document P' (referred to as XPath (P') hereafter).

Figure 7:
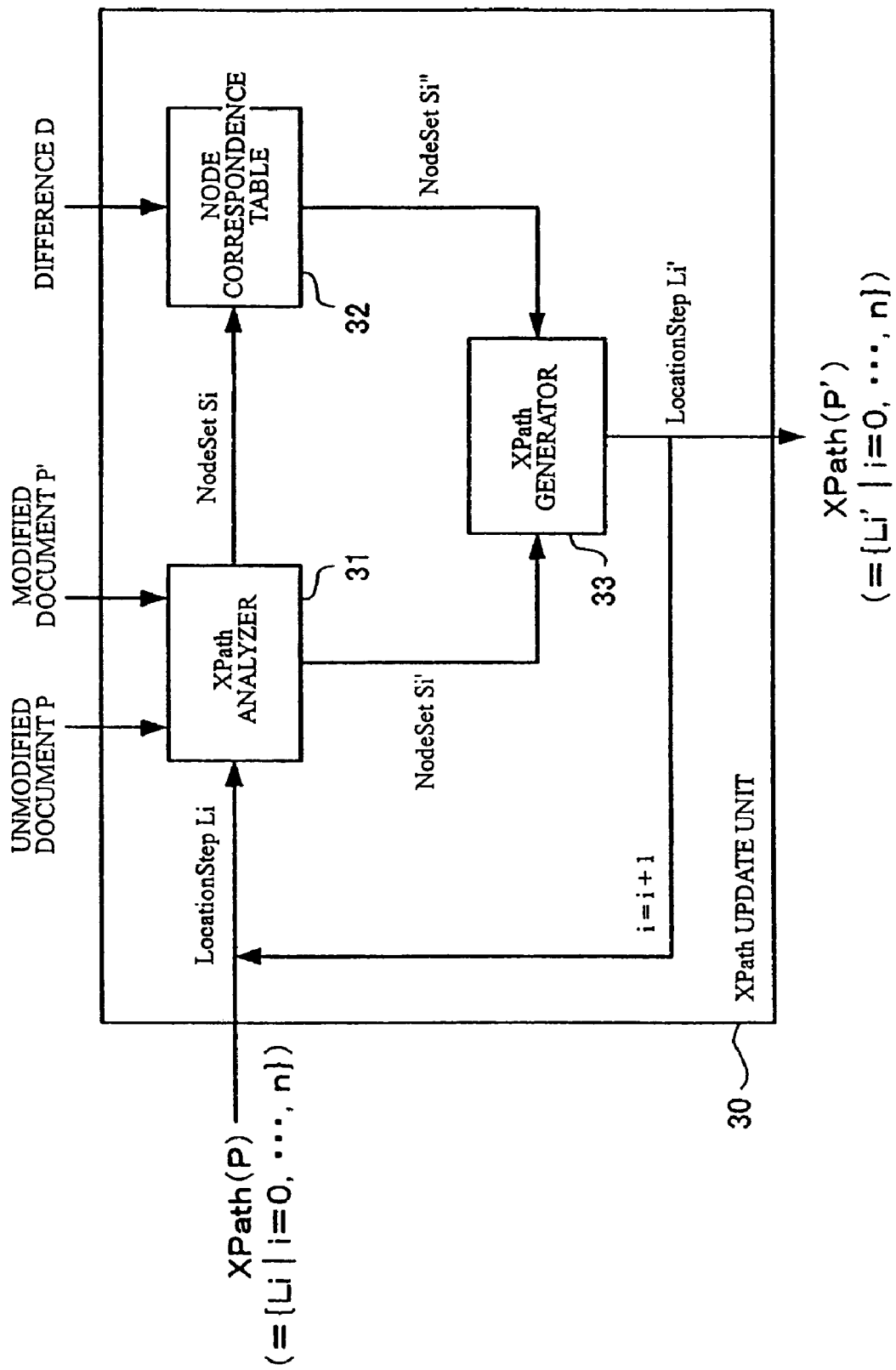
FIG. 7 is a functional block diagram of an XPath update unit in the embodiment.

FIG. 7 is a functional block diagram of the XPath update unit 30.

Referring to FIG. 7, the XPath update unit 30 for generating addressing information includes a function for interpreting an XPath (XPath interpreter 31), a function for storing information on correspondences between nodes in the unmodified and modified structured documents (node correspondence table 32), and a function for generating an XPath (XPath generator 33). The XPath update unit 30 receives inputs to be processed, that is, the unmodified document P, the modified document P', the differences D between the unmodified document P and the modified document P', and the XPath (P) from memory means such as the main memory 103 or the hard disk 105. Then, the XPath update unit 30 generates the XPath (P') with these functions. The generated XPath (P') is stored in memory means such as the hard disk 105.

Now, the XPath update processing performed by the XPath update unit 30 will be described in detail below.

Figure 8:
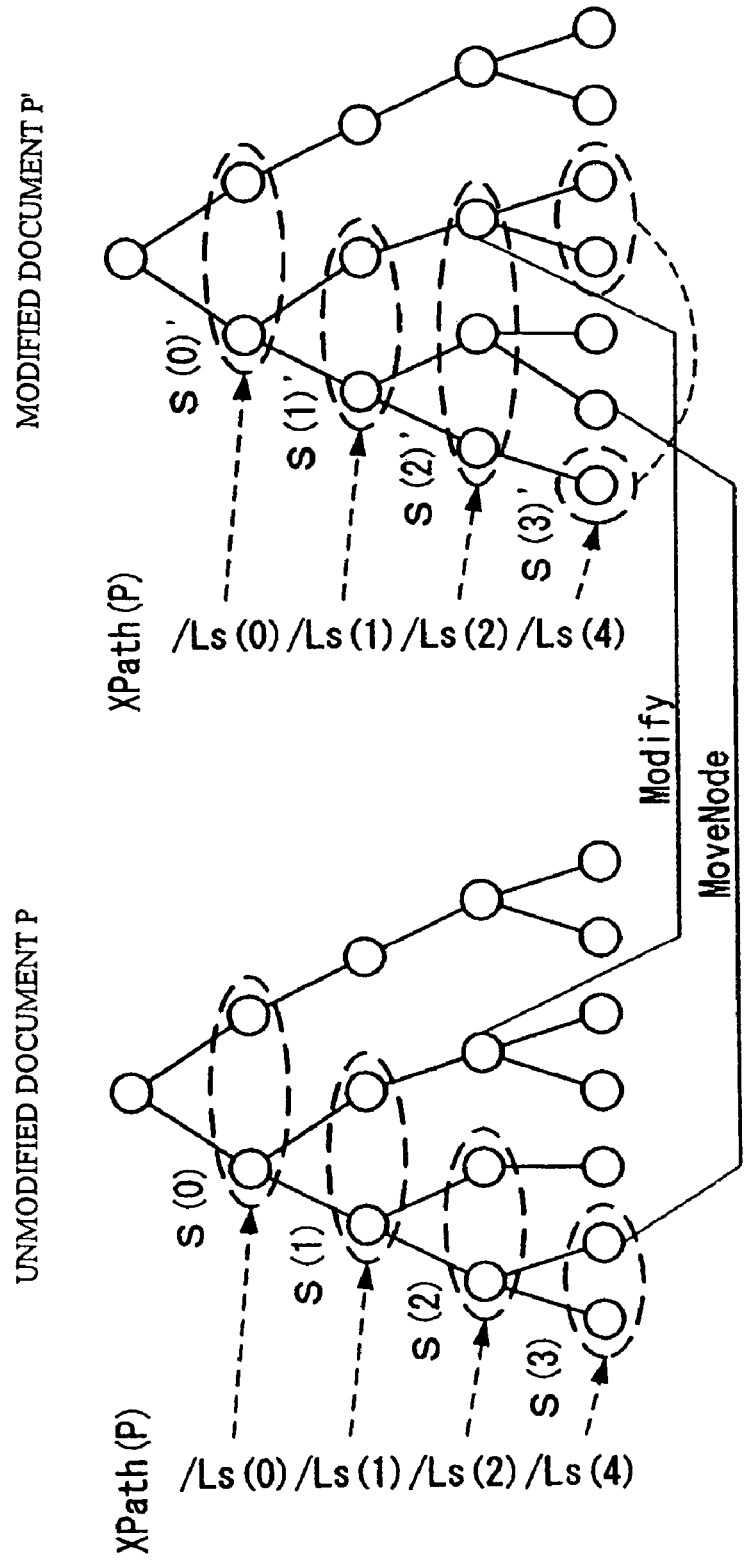
FIG. 8 shows node correspondences between an unmodified document P and a modified document P' in the embodiment.

FIG. 8 shows node correspondences between the unmodified document P and the modified document P'.

The XPath (P) is formed of layers of paths (LocationStep) Ls (i) (i=0, 1, 2, ..., n). In the unmodified document P, each set of nodes to be addressed by the LocationStep Ls (i), which is a NodeSet S (i), is computed in processing performed by the XPath interpreter 31. Similarly, in the modified document P', a NodeSet S (i)' to be addressed by the LocationStep Ls (i) is computed.

Figures 10, 11:
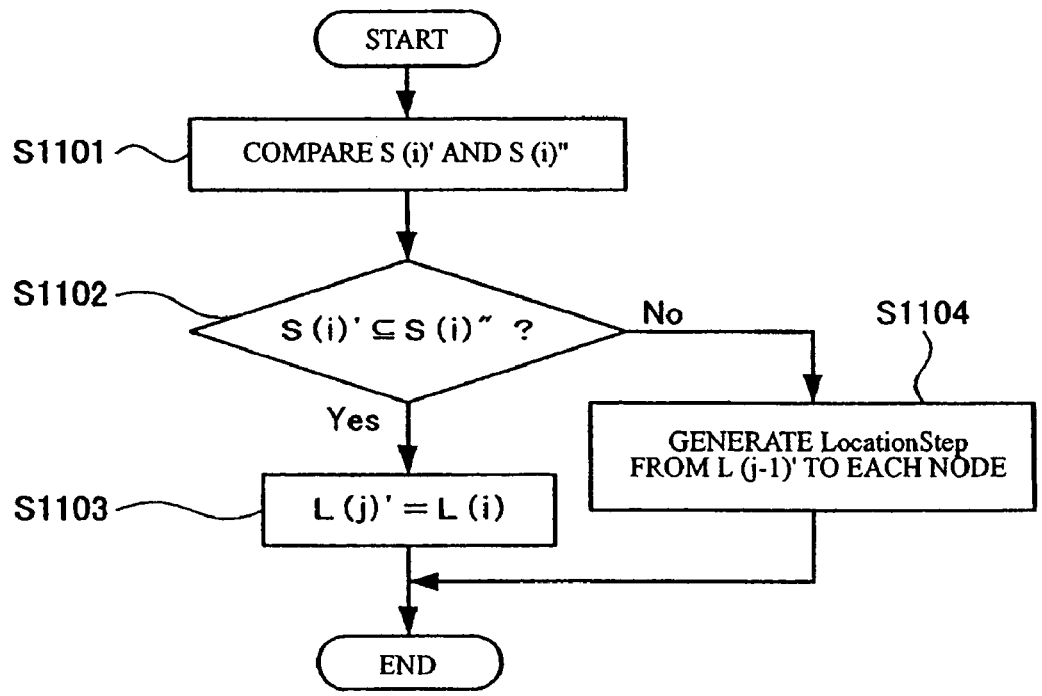
FIG. 10 shows an example of a node correspondence table used in the embodiment.
FIG. 11 is a flowchart showing a process of generation of an XPath by an XPath generator according to the embodiment.

On the other hand, the node correspondence table 32, which represents the node correspondences between the unmodified and modified documents P and P', is generated from the unmodified document P, the modified document P', and the differences D between the unmodified and modified documents P and P'. The generated node correspondence table 32 is stored in memory means, such as a register of the CPU 101 or the main memory 103, in the computer shown in FIG. 1. An example of the node correspondence table 32 is shown in FIG. 10. The node correspondence table 32 in this figure shows that, for example, a node N0 in the unmodified document P corresponds to a node N'0 in the modified document P', and a node N3 in the unmodified document P has no corresponding node in the modified document P' (the node N3 has been removed by the modification of the structured document).

Based on the node correspondence table 32 and the NodeSet S (i) to be addressed by the LocationStep Ls (i) in the unmodified document P, a NodeSet (i)" is obtained.

Figure 9:
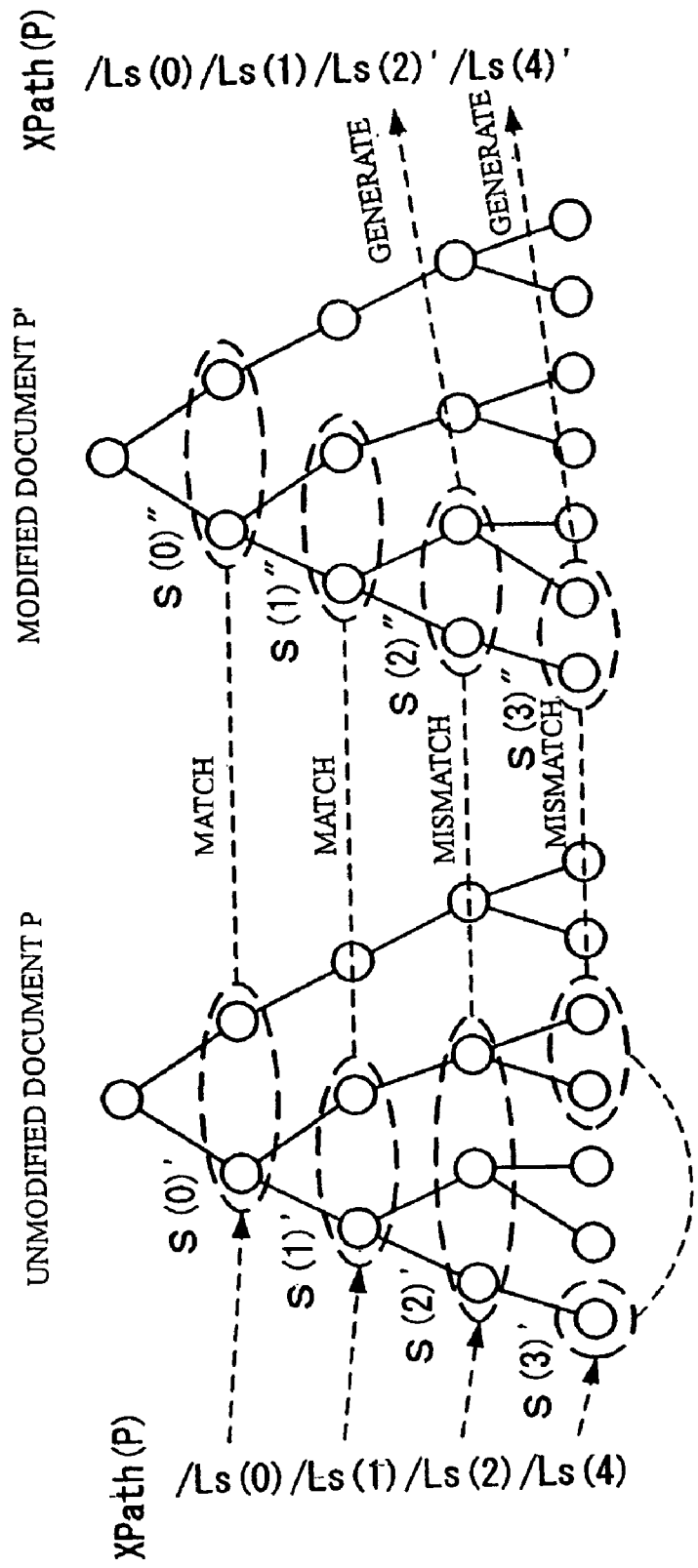
FIG. 9 shows correspondences between a NodeSet S (i) and a NodeSet S (i)" in the embodiment.

FIG. 9 shows correspondences between the NodeSet S (i)') and the NodeSet S (i)".

The difference between the NodeSet S (i)' and the NodeSet S (i)" is that the NodeSet S (i)' is obtained simply by applying path patterns to the modified document P', whereas the NodeSet S (i)" is obtained by tracking modifications based on the difference information. It is noted that both the NodeSet S (i)' and the NodeSet S (i)" are sets of nodes in the modified document P'.

Next, the XPath generator 33 compares the NodeSet S (i)' and the NodeSet S (i)", and updates the LocationStep Ls (i) in the XPath (P). The details of the update will be described later. Repeating this process for i (i=0 to n) provides LocationStep Ls (j)' (j=0, 1, 2, ..., m). This LocationStep Ls (j)' directly represents an updated XPath (P').

FIG. 11 is a flowchart showing a process of generation of the XPath (LocationStep) by the XPath generator 33.

Referring to FIG. 11, the XPath generator 33 first compares the NodeSet S (i)' and the NodeSet S (i)" (step 1101). Then, if the NodeSet S (i)' and the NodeSet S (i)" are equal or if the NodeSet S (i)' is included in the NodeSet S (i)", the LocationStep Ls (i) needs no modification and is output directly as the LocationStep Ls (j)' (step 1102, 1103).

If the NodeSet S (i)" is included in the NodeSet S (i)', then the XPath generator 33 generates a LocationStep from the nodes addressed by the LocationStep Ls (j-1)' to the nodes included in the NodeSet S (i)" (step 1103, 1104).

In this manner, the LocationSteps corresponding to the modified document P' are generated, and the XPath (P) is modified into the XPath (P)'.

Some types of XPath notation allow the LocationSteps generated in step 1104 to be integrated into a simple expression by generalizing them based on a predetermined generalization rule. If the LocationStep Ls (j)' cannot be generated based on a given generalization rule, the LocationSteps generated in step 1104 may be directly output while processing for an error is performed, such as displaying an alarm window or a window prompting for correction.

The generation of the LocationSteps in step 1104 may be performed, for example, with a known strategy disclosed in the literature 1 below. The integration of the LocationSteps may be performed, for example, with a known strategy disclosed in the literature 2 below.

Literature 1: Nov. 8, 2001: A Visual Approach to Authoring XPath Expressions Accepted for Markup Languages: Theory and Practice, Vol. 3, No. 2. This is a paper originally published in the Proceedings Extreme Markup Languages 2001, pp. 1-15, Montreal, Canada (14-17, Aug. 2001). http://ares.trl.ibm.com/freedom/doc/extml2001/abe0114.html Literature 2: Jul. 13, 2001: XSLT Stylesheet Generation by Example with WYSIWYG Editing Accepted for the presentation at International Symposium on Applications and the Internet (SAINT 2002) http://ares.trl.ibm.com/freedom/doc/saint2002/saint2002.html Now, the method for updating an XPath will be described based on examples of the tree modification.

Figure 12:
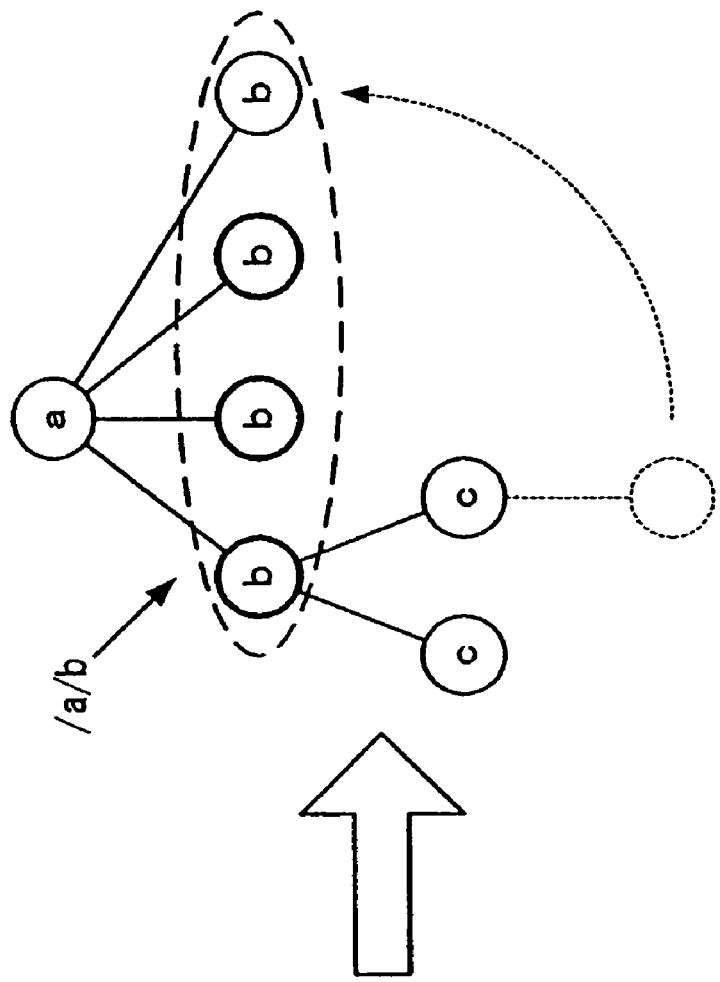
FIG. 12 shows examples of the unmodified document P and the modified document P'.
Figure 12:
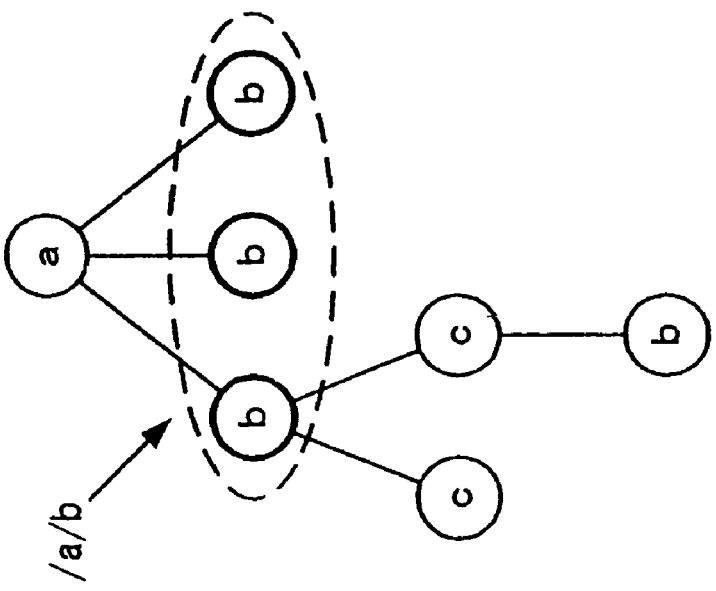
Figure 13:
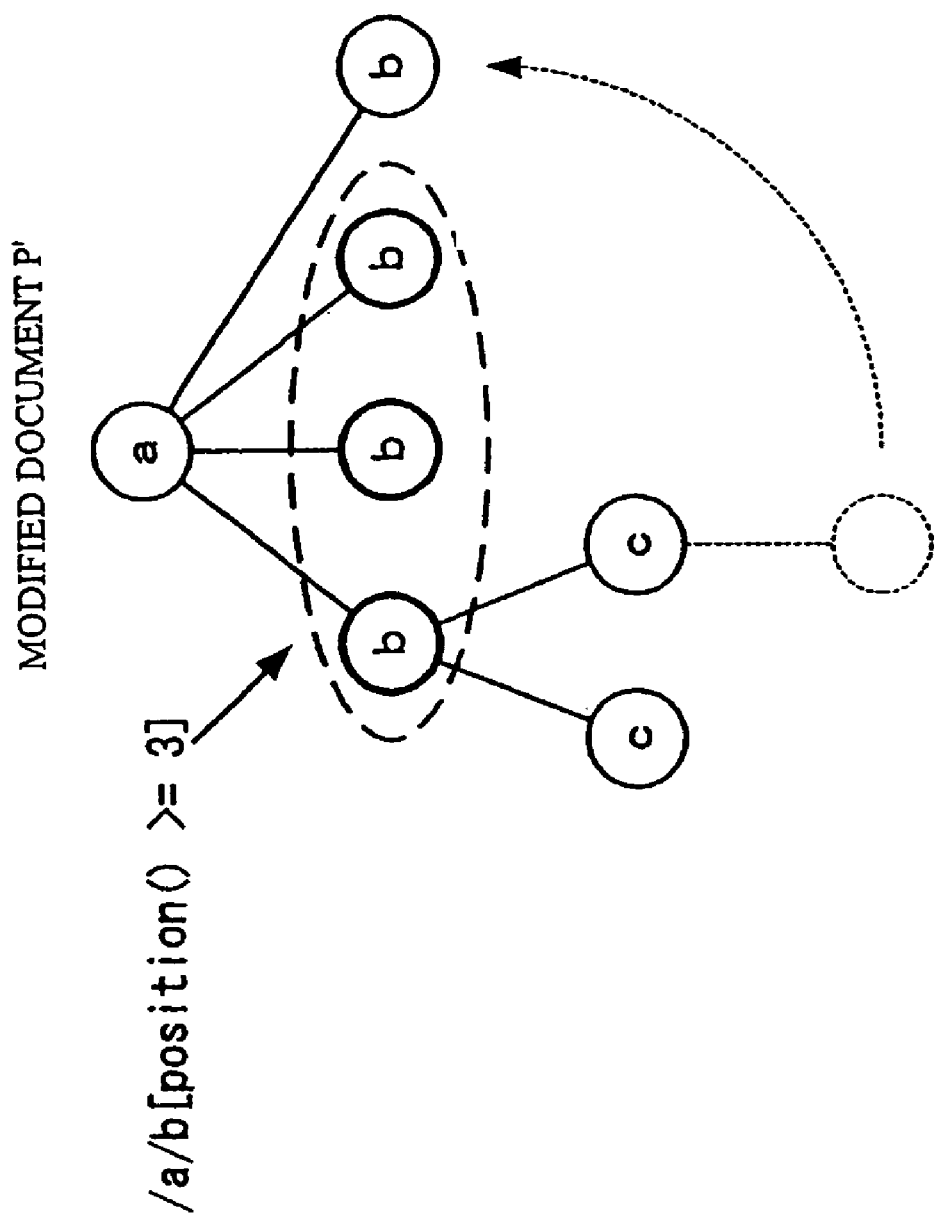
FIG. 13 shows an XPath updated according to the modified document P'.
Figure 14:
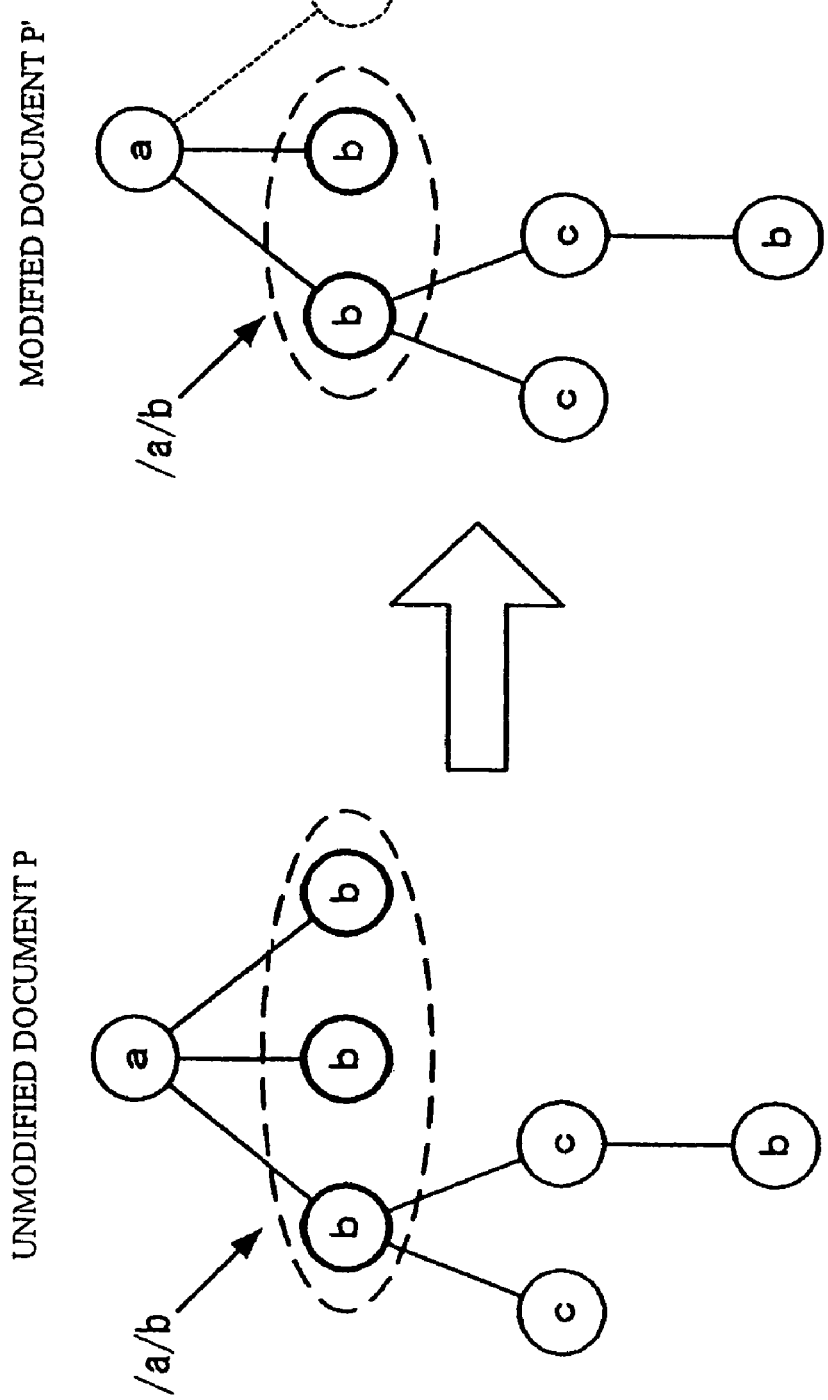
FIG. 14 shows another examples of the unmodified document P and the modified document P'.

FIGS. 12 to 14 show examples of the unmodified document P and the modified document P'. These figures show tree structures of the structured documents P and P'. Referring to FIG. 12, the unmodified document P has a tree structure including a root node a and its three child nodes b. The leftmost node b has two child nodes c, in which the right node c has one child node b. On the other hand, the modified document P' has a structure in which the node b under the node c has been moved to be a child of the node a.

Here, suppose that an XPath (P) "/a/b" for the unmodified document P addresses the three child nodes b of the node a. The expression "/a/b" addresses all child nodes b of the node a. Where the unmodified document P has been modified into the modified document P', the "/a/b" would, if used as it is, address the four child nodes b of the node a in the modified document P'. However, the node b that has been moved to be a child of the node also existed in the unmodified document P and was a node that was not addressed by the "/a/b". Therefore, it should not be addressed by the "/a/b" in the modified document P' as well.

In this embodiment, the XPath update unit 30 can refer to the node correspondence table 32 generated according to the differences D computed by the difference computation unit 20, and know that the three nodes b addressed by the XPath (P) in the unmodified document P correspond to the first to third nodes b from left among the four nodes b in the modified document P', as shown in FIG. 13. Therefore, the XPath generator 33 generates an XPath (P') that addresses only these three nodes b (nodes b that existed in the same positions in the unmodified document P). That is, the expression "/a/b" is modified into the expression "/a/b[position( )>=3]".

Referring to FIG. 14, the unmodified document P is the same as in FIG. 12, whereas in the modified document P', one of the tree child nodes b of the node a has been removed. In this case, the NodeSet addressed by the expression "/a/b" in the modified document P' is included in the NodeSet addressed by the expression in the unmodified document P. That is, the expression addresses no redundant nodes. Therefore, the expression of the XPath needs no modification. In some applications according to this embodiment, a user may be notified that one of the addressed nodes b has been removed in the modified document P'.

As described above, this embodiment enables detecting a difference between an unmodified version and a modified version of a modified structured document, and based on the difference, automatically updating a corresponding XPath. However, in practice, the XPath may not be updated exactly according to the intention of a developer of a system involving the structured document and the XPath. In addition, the developer may want to further modify the XPath after it is automatically updated. Therefore, this embodiment can also be implemented as an interactive XPath update tool.

Figure 15:
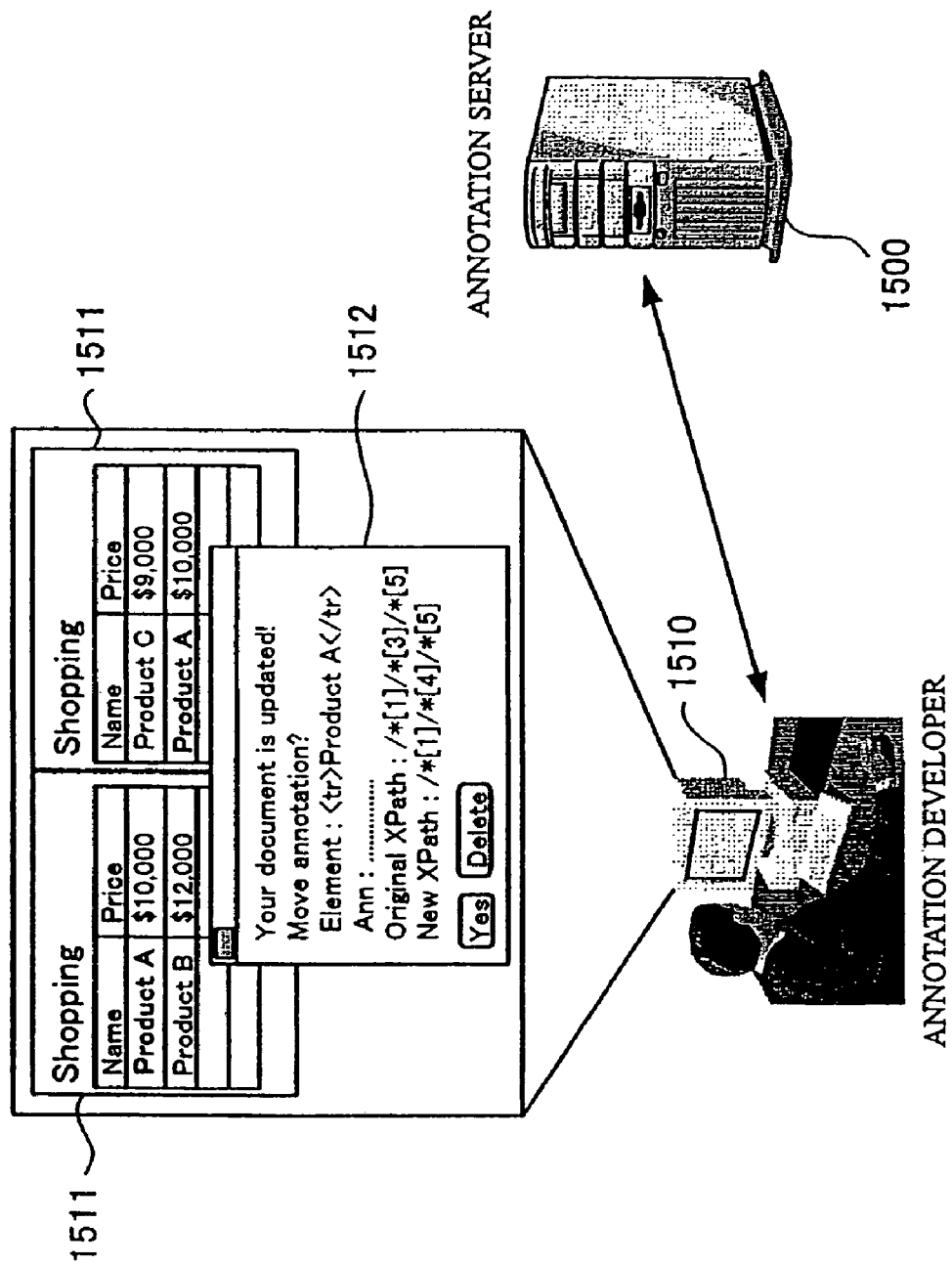
FIG. 15 shows an exemplary annotation system provided with an XPath update tool according to the embodiment.

FIG. 15 shows an exemplary annotation system provided with such an XPath update tool. In FIG. 15, an annotation server 1500 has functions corresponding to the document analysis unit 10, the difference computation unit 20, and the XPath update unit 30 according to this embodiment. These functions are provided as functions of a program-controlled CPU in a computer embodying the annotation server 1500. A display unit of a console 1510 operated by an annotation developer displays a structured document 1511 to be processed (for example, an HTML/XML document) and an interaction window 1512 for updating an XPath.

When the certain structured document 1511 annotated under the control of the annotation server 1500 is modified, the annotation server 1500 causes the display unit of the console 1510 to display an unmodified version and a modified version of the structured document 1511, and the interaction window 1512. The annotation server 1500 then asks the annotation developer whether to update the XPath according to the modification made to the structured document 1511. If the annotation developer clicks on the button "Yes" on the interaction window 1512, the XPath is automatically updated by the functions corresponding to the document analysis unit 10, the difference computation unit 20, and the XPaths update unit 30 of the annotation server 1500. If the annotation developer clicks on the button "Delete", the XPath is deleted and the annotation for the structured document 1511 is cleared. For an element (node) simply removed or modified in the structured document 1511, reference to its XPath becomes impossible. Here, a message may be output for notifying the annotation developer of the removal of the annotated element and asking the developer whether to add the annotation to another element.

Although the foregoing describes addressing elements in a structured document such as XML or HTML/XML document using XPath, this embodiment may also be applied to addressing elements in a structured document by any other means. Specifically, differences between an unmodified version and a modified version of a modified structured document may be computed by a function corresponding to the difference computation unit 20 described in this embodiment, and modifications may be made as suitable for means for addressing elements in the structured document (such as addressing information). Then, the details of element designations may be appropriately updated according to modifications made to the structured document.

Thus, as described above, the invention can keep a desired element properly addressed in a structured document in which particular elements are addressed, even if the structured document is modified. The invention can also provide means for automatically updating an XPath addressing a particular element in a structured document based on a modification made to the structured document if the structured document is modified.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A program embodied in computer readable medium for controlling a computer so that the computer performs data processing for addressing at least one predetermined element in a structured document, the program causing the computer to perform:

first processing of, when the structured document having the element addressed by predetermined addressing information is modified, inputting the structured document to analyze the modification and storing an analysis result in a memory; and second processing of reading the analysis result from the memory and updating the addressing information according to the analyzed modification so that the addressing information addresses at least one corresponding element in the modified structured document; and wherein the first processing provided by the program comprises the processing of:

converting an unmodified version and a modified version of the structured document into tree-structured data items; and computing a difference between the tree-structured data items to track a component of the tree-structured data items that is moved in operations required for transformation between the tree-structured data items transformed from one to the other according to modification of the structured document; and wherein in the second processing provided by the program, the program causes the computer to update the addressing information based on the difference between the tree-structured data items.

2. A program embodied in computer readable medium for controlling a computer so that the computer performs data processing for addressing at least one redetermined element in a structured document, the program causing the computer to perform:

first processing of, when the structured document having the element addressed by predetermined addressing information is modified, inputting the structured document to analyze the modification and storing an analysis result in a memory; and second processing of reading the analysis result from the memory and updating the addressing information according to the analyzed modification so that the addressing information addresses at least one corresponding element in the modified structured document; and wherein in the second processing provided by the program, the program causes the computer to update an XPath describing the addressing information by regenerating LocationSteps forming the XPath based on the difference between the unmodified version and the modified version of the structured document.

3. A program according to claim 2, wherein the first processing provided by the program comprises the processing of:

converting an unmodified version and a modified version of the structured document into tree-structured data items; and computing a difference between the tree-structured data items, and wherein in the second processing provided by the program, the program causes the computer to update the addressing information based on the difference between the tree-structured data items.

4. A program according to claim 3, wherein in the processing of computing the difference provided by the program, the program causes the computer to compute the difference between the tree-structured data items to track a component of the tree-structured data items that is moved in operations required for transformation between the tree-structured data items transformed from one to the other according to modification of the structured document.

* * * * *